Dec. 10, 1968  J. L. GOLDMAN  3,415,214
SHIPBOARD CARGO STOWAGE CONSTRUCTION
Filed Aug. 2, 1967  3 Sheets-Sheet 1

INVENTOR
Jerome L. Goldman
BY Wilkinson, Mawhinney & Thibautt
ATTORNEYS

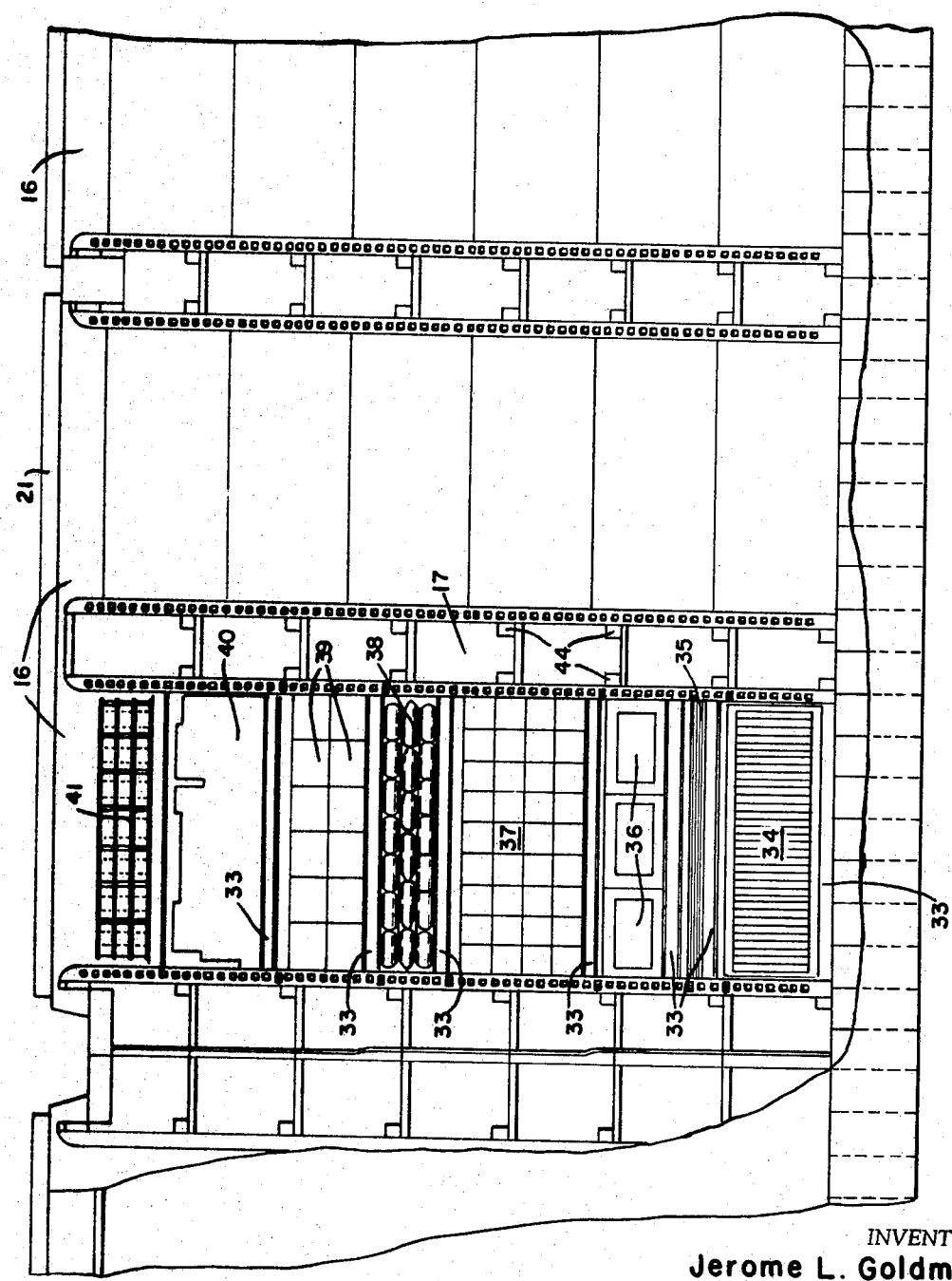

Dec. 10, 1968   J. L. GOLDMAN   3,415,214
SHIPBOARD CARGO STOWAGE CONSTRUCTION
Filed Aug. 2, 1967   3 Sheets-Sheet 3
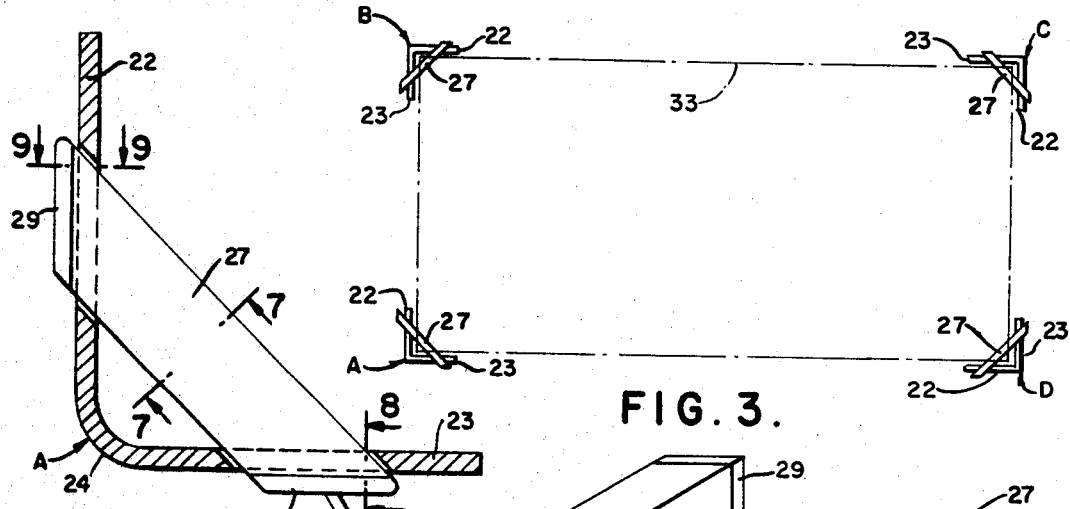
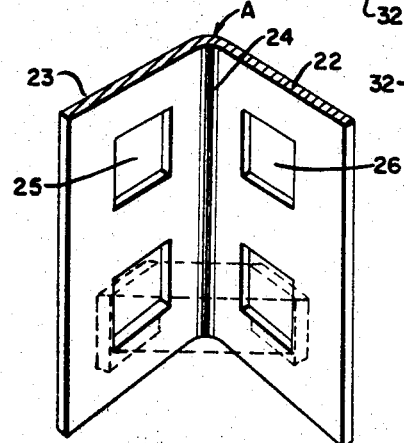
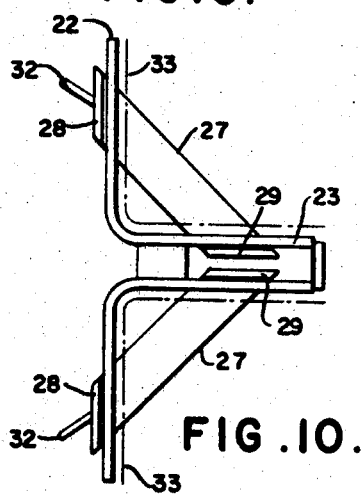
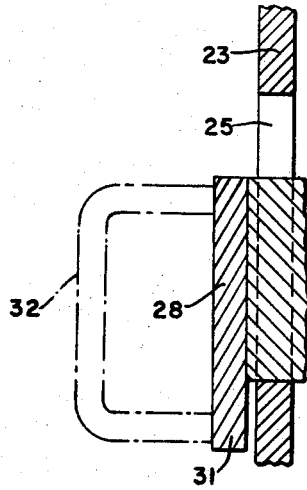
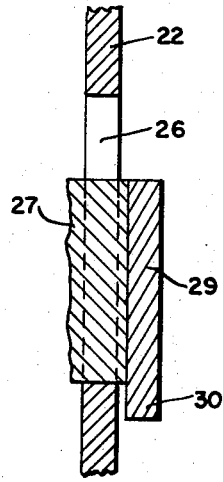
INVENTOR
Jerome L. Goldman
BY Wilkinson, Mawhinney & Theibault
ATTORNEYS

# United States Patent Office 3,415,214
Patented Dec. 10, 1968

3,415,214
SHIPBOARD CARGO STOWAGE
CONSTRUCTION
Jerome L. Goldman, 5724 Bancroft Drive,
New Orleans, La. 70122
Filed Aug. 2, 1967, Ser. No. 657,996
6 Claims. (Cl. 114—72)

ABSTRACT OF THE DISCLOSURE

The invention relates to a new type of shipboard cargo hold cells for the rapid and efficient stowage of cargo on or in cargo receivers, such as pallets and/or containers, in which a plurality of horizontal supports for the cargo cooperates with a vertical supporting structure in the cell whereby the horizontal supports, adjustable to any desired height in the vertical structure and employed in any appropriate numbers, individually sustain each its own load quite apart from and independently of the load or loads sustained in like manner by the several other receivers to the end that superposed loads need not be increased beyond limits creating liability to crushing or damage to cargo beneath.

---

From a specific structural aspect a form of the invention comprises four corner vertical supports, rising generally to the height of the cell in which erected, having a vertical succession of pairs of slots in angle walls thereof for selectively receiving horizontal supports on which corner portions of the cargo receivers are placed, such horizontal supports being readily portable and having locking means to interlock when put in place with the angled walls and maintained in such condition through superposed weight of the cargo loaded thereon against unlocking incident to any rolling motion of the ship in a seaway.

This invention relates to a new type of shipboard cargo hold cells for the rapid and efficient stowage of pallets and/or containers. Specialized ships for carrying containers have become widely used in recent years and such vessels generally have cellular structures in their cargo holds. The cellular structures serve to define vertical storage areas in which the containers can be stacked one upon the other, and the containers are restrained from shifting in any horizontal direction while the vessel is rolling in a seaway.

The use of such cells permit extremely fast loading or discharging of the containers from the ship. These cells consist generally of vertical members at each corner of the rectangular storage pattern of the container, with each corner member being formed of an L-shaped metal angle or flanged plate, and so arranged that the container has very little clearance both athwartships and fore and aft, generally ½" all around, while at the same time the container can be easily moved vertically within the cell both upwards and downwards by the container handling cranes.

Pallets for utilizing general cargo have been widely used aboard ship for many years. A pallet is essentially a shallow platform upon which a number of items of cargo can be stowed and all handled as a unit instead of as individual items, to save labor cost and time. Such pallets are lifted on board ship and are placed upon one of the decks within the cargo hold. The height of cargo that may be stacked upon an individual pallet is limited to a range generally of 2 to 6 feet high and occasionally somewhat higher. This height limitation may be caused by any one or a combination of the following reasons:

(a) If stacked too high, the lowest portion of the cargo may be crushed by the superimposed weight of the cargo above.

(b) For manual loading of pallets, the height may be limited to what men can conveniently lift up and put in place.

(c) If the load becomes too high, it may tend to fall off while being moved from the warehouse to the ship. There are additional reasons but the foregoing are the most frequent. In a typical shipboard cargo space, after one row of pallets have been stacked on the deck, there may be room for a second row above it. If so, it is usual to lay strips of woods, called dunnage, upon the lowest pallet which serves to spread the load imposed by the second row of pallets and thus prevents damage to cargo on the lower row of pallets. This procedure requires considerable manual work, is costly in the lumber required for dunnage, and in a deep cargo space there will be a limit to how many tiers of pallets may be stacked upon one another without damaging the cargo on the lowest tier of pallets, despite the use of dunnage.

My invention utilizes the vertical cell principle for the stowage of pallets. To eliminate the problem of the pallets resting one upon another, my invention permits the cellular structure to carry the weight of each pallet, regardless of how many pallets are loaded in the same vertical cell. Thus, the ship will not require costly intermediate decks and hatches that all past pallet carrying ships found necessary, reducing the cost of such a ship by an appreciable amount. Further, the cost of labor and material for dunnaging and securing pallets is eliminated entirely, as the cells keep the pallet from shifting even under severe sea conditions. All pallets are desposited in final on-board position by the crane, requiring no manual effort in moving cargo within the hold. Every pallet can be loaded with a different height of cargo, as it is no longer necessary to have relatively horizontal level of a lower tier of pallets upon which to place wood dunnage strips prior to loading a second layer of pallets. Further, the same cells may be used for containers, for pallets, or simultaneously a mixture of containers and pallets, giving previously unknown flexibility and economy to the ship operator.

With the foregoing and other objects in view, the present invention will be more fully described hereinafter, and will be more particularly pointed out in the claims appended hereto.

In the drawings, wherein like symbols refer to like or corresponding parts throughout the several views:

FIGURE 2 is a similar view illustrating adjoining vertical cargo cells with walkways therebetween and showing flexibility of cargo stowage in which containers may be mixed with pallets.

FIGURE 3 is a horizontal sectional view showing the four corner vertical supports with horizontal supports in place therein and a pallet or container or other cargo receiver indicated in dotted lines.

FIGURE 4 is an enlarged horizontal sectional view through one of the corner vertical supports showing the pair of slots and a horizontal support member in place therein.

FIGURE 5 is a fragmentary perspective view showing a form of vertical corner support having pairs of slots for receiving a horizontal support at selected elevations.

FIGURE 6 is a perspective view of a form of horizontal support member.

FIGURE 7 is a cross section taken through the horizontal support member on the line 7—7 of FIGURE 4.

FIGURE 8 is a vertical sectional view showing the horizontal support member locked in place in a member wall of a vertical support, taken on the line 8—8 of FIGURE 4.

FIGURE 9 is a vertical sectional view taken on the line 9—9 of FIGURE 4, showing the other end of the horizontal support locked in the other wall of the corner member; and FIGURE 10 is a plan view showing corner members of adjoining supporting structures where the cell is wide enough to receive twin structures.

Figure 1:
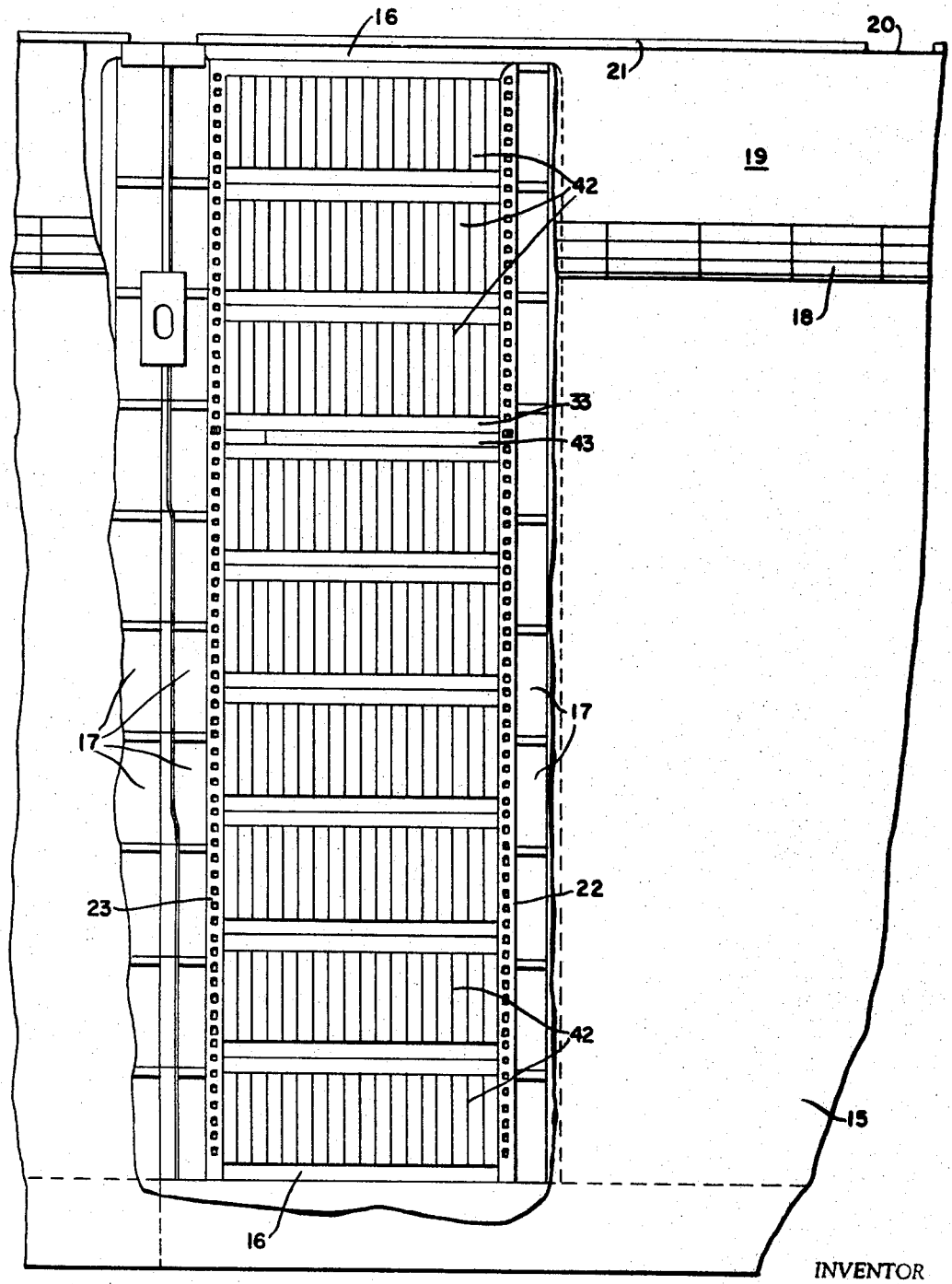
FIGURE 1 is a fragmentary side elevation of the hull of a cargo ship with parts broken away showing a vertical cargo cell equipped with construction according to the present invention.

Referring more particularly to the drawings, in FIGURE 1, 15 designates the hull of a cargo vessel having one of a number of vertical cargo cells 16 with walkways 17 to at least one side of the cell throughout its entire vertical elevation to permit porters, stevedors, or the like, to gain access to all vertical sections of the cell for a purpose later apparent.

The main deck 18 has the coaming 19 extending upwardly therefrom about hatches covered by the usual removable hatch covers 21. The upper deck is shown at 20. Within each cell is disposed a cellular supporting structure comprising generally four corner vertical supports A, B, C and D (FIGURE 3). Each of these vertical corner supports is preferably constructed of two walls 22, 23, for which see FIGURES 4 and 5. The walls 22, 23 are right angularly arranged and connected by rounded corner webs 24 as shown more particularly in FIGURE 5. Pairs of horizontally aligned slots 25, 26 are made through the adjoining walls 22, 23. These slots are repeated all of the way up and down the vertical supports A, B, C and D in suitably spaced relation to provide for the support of the horizontal vertical support members 27 shown more particularly in FIGURES 6 and 7. In FIGURE 7 the horizontal support member 27 is shown to be hollow and of substantially rectangular construction. However, these support members or support bars may be solid and of any other cross sectional configuration. The support members 27 are sufficiently long to span the space between any pair of slots 25, 26 and to extend completely through such slots where the support members 27 have affixed thereto end plates 28, 29 having dependent locking bars 30, 31. As shown in FIGURES 8 and 9 these locking bars 30, 31 drop downwardly on opposite outside surfaces of the walls 22, 23 when the locked member 27 is moved to the complete home position shown in FIGURES 4 and 10. By reason of this engagement by the locking bars 30, 31 with the walls 22, 23 of the corner vertical supports A, B, C and D, the horizontal support members 27, are effectively locked to such corner vertical supports in erected positions, and such horizontal support members 27 themselves are held in positions where they receive and support corner portions of pallets 33 or boxes or other containers of cargo. The horizontal portable support members have handles 32 affixed to the front end plates 28 for convenient handling.

As shown more particularly in FIGURE 2, 34 represents large crated machinery resting upon the base or bottom of the cell while a pallet 33 spaced above and supported by he cellular structure in turn individually supports a quantity of steel plates 35. Spaced above the steel plates is another pallet 33 supporting crated cargo 36 above which is a further pallet 33, taking its full support from the vertical and horizontal supports constituting the cellular construction, carrying boxed cargo 37. Above the boxes 37 is still another pallet 33, carried by the cellular construction, for supporting sacks 38 of other character cargo. An additional pallet 33 spaced above the sacked material is shown as supporting cartons 39.

Yet another pallet 33 is affixed to the cellular construction above the cartons 39 for supporting irregularly shaped uncrated cargo 40 and above this uncrated cargo is a still further pallet 33 individually supporting oil drums 41.

In FIGURE 1 six containers 42 are shown as deriving their support from one another by reason of direct superposition upon one another, the lowermost of which rests upon the bottom of the cell without any support from the vertical or horizontal cellular construction.

Above the uppermost container a pallet 33 is affixed to the supporting structure carrying three additional containers 42. An air gap 43 is left between the sixth and seventh containers.

In the walkways 17 there may be provided stools 44 to enable the longshoremen to reach the height of all slots 25, 26 in a given walkway.

With this invention, a pallet can be loaded to its maximum weight whether the cargo is very light or very heavy. The light cargo will take up a great deal of height while the very heavy cargo will take up very little height. If such cargo were placed in standard containers, the very heavy cargo would use up only a fraction of a space within the container before the container reached its allowable maximum weight of load. Conversely, with very light cargo, the container's internal volume may be completely used before the allowable weight of cargo has been reached. When the same cargo is being loaded on pallets, the most efficient use of both maximum weight per unit and minimum loss of ship's space can be achieved due to the flexibility inherent in my invention.

As previously mentioned, standard containers are usually designed to be loaded no more than 6-high when all containers are of maximum allowable loaded weight. By the use of my invention, containers may be loaded 7, 8 or 9, or more units high by fitting pallet supports directly above the sixth-high container in the lowest portion of a hold. FIGURE 1 shows a nine-high pattern with portable pallet supports carrying the weight of the upper three containers. This permits much deeper and more efficient holds to be utilized for container ships than are possible with present cellular structures.

What is claimed is:

1. A shipboard cargo stowage construction for cargo receivers comprising:
  (a) a hull,
  (b) at least one vertical cargon cell in the hull,
  (c) vertical supports in the cell,
  (d) means for individually supporting the receivers and their cargo loads from the vertical supports, and
  (e) a plurality of vertically spaced walkways adjacent the cell giving access to all elevations of the cell for the selective locating of said means at various elevations consistent with load volumes and load overall heights.

2. A shipboard cargo stowage construction for cargo receivers comprising:
  (a) a hull,
  (b) at least one vertical cargo cell in the hull,
  (c) vertical supports in the cell,
  (d) means for individually supporting the receivers and their cargo loads from the vertical supports, said vertical supports comprising
  (e) angled corner walls, said walls having
  (f) aligned spaced slots and said means comprising
  (g) horizontal support members detachably fitted through the slots in the positions of hypotenuse members to the angles of the walls.

3. A shipboard cargo storage construction as claimed in claim 2 further comprising:
  (h) locking means between the angled corner walls and the horizontal support members for automatically locking when the support members are pushed home in the slots.

4. A shipboard cargo storage construction as claimed in claim 3 in which said locking means comprises:
  (i) flanges dependent from opposite ends of the horizontal supports.

5. A shipboard cargo stowage construction for cargo receivers comprising:
  (a) a hull,
  (b) at least one vertical cargo cell in the hull, (c) vertical support in the cell,
(d) means for individually supporting the receivers and their cargo loads from the vertical supports, said vertical supports being at least four in number, each comprising
(e) two walls meeting outwardly in substantially right dihedral angles and fixed at their lower edges in the floor of the cell and having
(f) horizontally-aligned pairs of slots in closely spaced vertical relation throughout substantially the entire vertical dimension of the walls, and said means comprising
(g) portable horizontal supports in cross-section corresponding at least generally to that of the slots and in length at least sufficiently long to rest at opposite end portions on the bottom edges of the slots.

6. A shipboard cargo storage construction as claimed in claim 5 in which the portable horizontal supports have end walls convergent to centers displaced at least slightly beyond the dihedral angles due to the lengths of the horizontal supports being greater than the distances between adjacent pairs of slots measured from opposite outside surfaces of the adjacent walls of the vertical supports thus displacing the end walls of the horizontal supports outwardly of the outer faces of the walls of the vertical supports and
(h) flanges dependent from the end walls of the horizontal supports adapted to drop down outside the walls of the vertical supports and lock the horizontal supports in selected place.

References Cited
UNITED STATES PATENTS

| | | | |
|---|---|---|---|
| 2,247,519 | 7/1941 | Pace | 214—10.5 X |
| 3,231,103 | 1/1966 | Tantlinger | 214—10.5 |

MILTON BUCHLER, *Primary Examiner.*

TRYGVE M. BLIX, *Assistant Examiner.*

U.S. Cl. X.R.

214—10.5